United States Patent
Tomlinson et al.

(10) Patent No.: US 9,963,535 B2
(45) Date of Patent: *May 8, 2018

(54) SWELL INDEX OF HIPS USING ADDITIVES

(71) Applicant: FINA TECHNOLOGY, INC., Houston, TX (US)

(72) Inventors: John Tomlinson, Prairieville, LA (US); Jose Sosa, Deer Park, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/663,648

(22) Filed: Mar. 20, 2015

(65) Prior Publication Data

US 2015/0252134 A1 Sep. 10, 2015

Related U.S. Application Data

(63) Continuation of application No. 13/075,211, filed on Mar. 30, 2011, now Pat. No. 9,090,715.

(51) Int. Cl.
| | |
|---|---|
| *C08F 279/02* | (2006.01) |
| *C08L 51/04* | (2006.01) |
| *C08F 2/00* | (2006.01) |
| *C08F 2/38* | (2006.01) |

(52) U.S. Cl.
CPC .............. *C08F 279/02* (2013.01); *C08F 2/00* (2013.01); *C08F 2/001* (2013.01); *C08F 2/38* (2013.01); *C08L 51/04* (2013.01)

(58) Field of Classification Search
CPC ...... C08L 51/04; C08F 279/00; C08F 279/02; C08F 279/04; C08F 279/06; C08F 2/00; C08F 2/001; C08F 2/38; C08F 2/42
See application file for complete search history.

(56) References Cited

U.S. PATENT DOCUMENTS

| | | | | |
|---|---|---|---|---|
| 5,264,492 | A * | 11/1993 | Demirors | C08F 279/02 525/193 |
| 5,629,383 | A * | 5/1997 | Doyle | C08F 279/02 525/285 |
| 9,090,715 | B2 * | 7/2015 | Tomlinson | C08F 2/00 |
| 2002/0032282 | A1 * | 3/2002 | Hsu | C08F 287/00 525/191 |
| 2005/0022939 | A1 * | 2/2005 | Reimers | B01D 1/0011 159/2.1 |
| 2007/0100079 | A1 * | 5/2007 | Sosa | C08F 279/02 525/244 |
| 2011/0054123 | A1 * | 3/2011 | Khabashesku | C08F 279/02 525/386 |
| 2012/0252975 | A1 * | 10/2012 | Tomlinson | C08F 2/00 525/53 |

OTHER PUBLICATIONS https://en.wikipedia.org/wiki/Equilibrium_constant; Wikipedia "Equilibrium constant"; 2017.*

* cited by examiner

*Primary Examiner* — Roberto Rabago
(74) *Attorney, Agent, or Firm* — Albert Shung

(57) ABSTRACT

A process for producing a high impact polystyrene having a high swell index may include feeding at least one vinyl aromatic monomer and at least one elastomer to at least one polymerization reactor to form a reaction mixture. The process may include polymerizing the reaction mixture, combining a chain transfer agent to the reaction mixture leaving the at least one polymerization reactor to form a combined mixture, and sending the combined mixture to a devolatilization zone. The process may include obtaining a HIPS product having a high swell index.

12 Claims, 4 Drawing Sheets

SWELL INDEX OF HIPS USING ADDITIVES

CROSS-REFERENCE TO RELATED APPLICATIONS

This application is a Continuation of U.S. patent application Ser. No. 13/075,211, filed on Mar. 30, 2011, now U.S. Pat. No. 9,090,715.

FIELD

The present invention is generally related to methods of making high impact polystyrene. More specifically, the present invention is generally related to methods of improving the swell index of high impact polystyrene.

BACKGROUND

Polystyrene is a widely used commercially available plastic. Pure polystyrene is a hard plastic having limited flexibility and is thus well suited to applications where its level of stiffness is acceptable. In other situations, the limited flexibility or rigidity of pure polystyrene may be unacceptable. In these situations, styrene-based copolymers, and particularly polystyrene resins that are modified with organic rubber particles or other elastomers, have been found useful. These rubber modified styrene compositions are typically referred to as high impact polystyrene, or HIPS.

In the final HIPS product, the rubber particles are incorporated into the HIPS product, wherein the incorporated rubber particles are crosslinked and the level of crosslinking is determined by the manufacturing process and can vary considerably. In certain applications it may be desirable to achieve a HIPS product having a low level of crosslinking.

Swell index values are a direct measure of the state of cross-linking in the rubber. As the level of cross-linking increases, swell index values decrease. It has been observed that a higher swell index may confer some desirable properties to HIPS. It would therefore be desirable to produce a HIPS product having an increased swell index in order to reduce crosslinking and thus have a final HIPS product having desirable properties.

SUMMARY

Disclosed herein is a method for producing high impact polystyrene having a high swell index that includes feeding at least one vinyl aromatic monomer and at least one elastomer to at least one polymerization reactor to form a first reaction mixture and polymerizing the first reaction mixture to form a second reaction mixture. A chain transfer agent is added to the second reaction mixture leaving the at least one polymerization reactor to form a combined mixture that is then sent to a devolatilization zone to obtain a high impact polystyrene product.

The high impact polystyrene product has a swell index greater than a comparable high impact polystyrene product not having a chain transfer agent added. The swell index can be at least 25% greater than a comparable high impact polystyrene product not having a chain transfer agent added. The devolatilization zone can be operated under temperatures less than 480° F. The high impact polystyrene product can have a swell index of at least 11.5, optionally at least 15.

The chain transfer agent can be selected from the group consisting of normal dodecylmercaptan (NDM), 9,10-dihydroanthracene, diethylbromomalonate, 2-naphthalenethiol, α-bromostyrene, β-bromostyrene, 9,10-dihydrophenanthrene, 1-phenyl-3,4-dihydronaphthalene, 1,1-diphenylethylene, α-methylstyrene dimer, and combinations thereof.

The reactor can include a pre-inversion reactor followed by an inversion reactor followed by at least one post-inversion reactor. In one embodiment the chain transfer agent can be added at any point after the inversion reactor. In one embodiment the chain transfer agent can be added after the final post-inversion reactor. The chain transfer agent can be added in amounts ranging from 10 to 10,000 ppm, optionally in amounts ranging from 100 to 1,000 ppm.

In an embodiment the high impact polystyrene product has a swell index that is greater than the swell index from a HIPS product in which a chain transfer is added only before the inversion reactor.

An alternate embodiment is a method for producing high impact polystyrene having a high swell index that includes feeding at least one vinyl aromatic monomer, an elastomer, and a free radical initiator to a first reactor to form a first reaction mixture. The reaction mixture is polymerized in the first reactor to a point below the point at which phase inversion occurs to form a second reaction mixture that is fed to a second reactor where it is further polymerized to at least a phase inversion point to form a third reaction mixture. A chain transfer agent is then added to the third reaction mixture at a point after the second reactor and the third reaction mixture further polymerized to produce a fourth reaction mixture. The fourth reaction mixture is then sent to a devolatilization zone operated at less than 480° F. where a high impact polystyrene product is obtained that has a swell index at least 50% greater than a comparable high impact polystyrene product not having a chain transfer agent added after the phase inversion point. In an embodiment the devolatilization zone can be operated at a temperature of less than 460° F. The high impact polystyrene product can have a swell index of at least 15.

Embodiments of the inventions include the high impact polystyrene made by the methods disclosed herein and any articles made therefrom.

Other possible embodiments include two or more of the above embodiments of the invention. In an embodiment the method includes all of the above embodiments and the various procedures can be carried out in any order.

DETAILED DESCRIPTION

Figure 1:
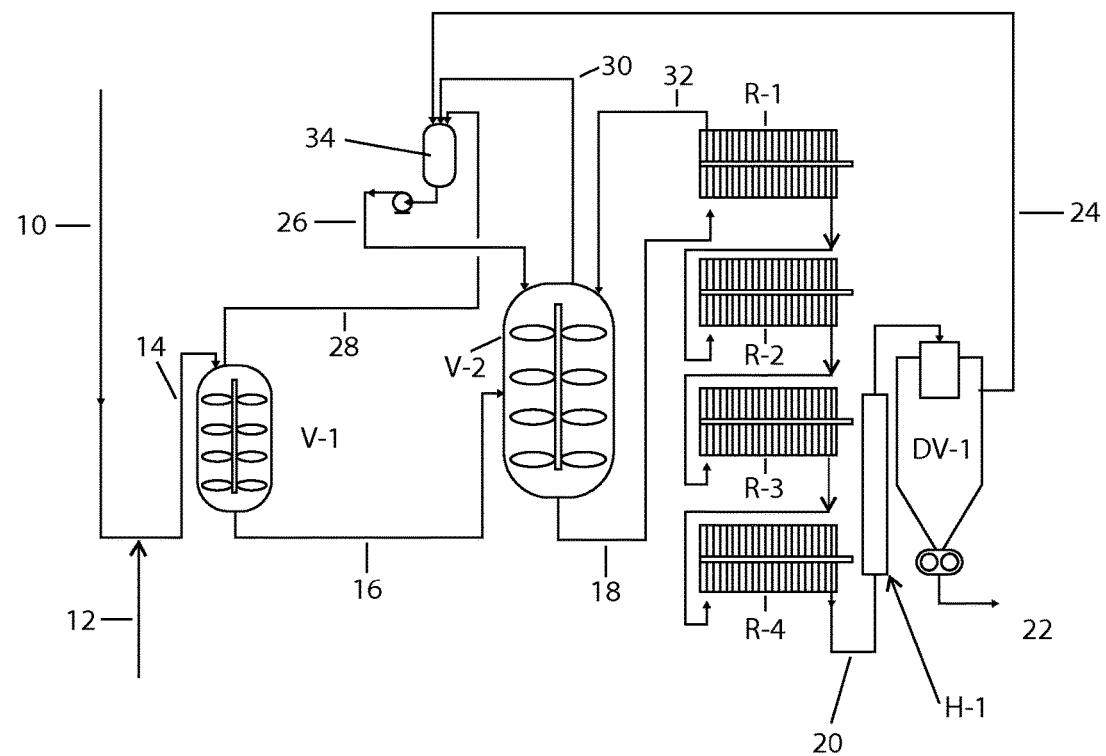
FIG. 1 is schematic of the process of an embodiment of the present invention.

The present invention includes methods of improving the swell index of high impact polystyrene (HIPS) by the addition of additives.

Rubber-reinforced polymers of monovinylaromatic compounds, such as styrene, alphamethyl styrene and ring-substituted styrenes are desirable for a variety of applications including refrigerator linings and packaging applications. The conventional term for such rubber reinforced polymers is "High Impact Polystyrene" or "HIPS". HIPS contains an elastomeric phase that is embedded in a styrenic polymer, resulting in a composition having an increased impact resistance. In an embodiment, a HIPS product contains a conjugated diene monomer as the elastomer. Examples of suitable conjugated diene monomers include without limitation 1,3-butadiene, 2-methyl-1,3-butadiene, 1 chloro-1,3 butadiene, and 2 chloro-1,3-butadiene. In another embodiment, the HIPS product contains an aliphatic conjugated diene monomer as the elastomer. Examples of suitable aliphatic diene monomers include, without limitation, $C_4$ to $C_9$ dienes such as butadiene monomers. The elastomeric component may also include blends or copolymers of the diene monomers. In an embodiment, the HIPS of the present invention may be manufactured utilizing one or more aspects as disclosed herein with a conventional HIPS polymerization process. Conventional manufacturing processes include mass polymerization and solution polymerization such as that disclosed in U.S. Pat. No. 2,694,692 or mass suspension polymerization such as that disclosed in U.S. Pat. No. 2,862,906, each incorporated by reference herein in their entirety. Other processes of manufacture may also be used.

The final HIPS product contains polystyrene. In an embodiment, one or more styrene compounds are used as monomers for the formation of the styrenic polymer. Styrene, also known as vinyl benzene, ethylenylbenzene, and phenylethene is an organic compound represented by the chemical formula $C_8H_8$. As used herein the term styrene includes a variety of substituted styrenes (e.g., alpha-methyl styrene), ring substituted styrene such as p-methylstyrene, disubstituted styrenes such as p-t-butyl styrene as well as unsubstituted styrenes.

In an embodiment, the styrenic monomers are present in a reaction mixture used to prepare HIPS in amounts from 1.0 to 99.9 weight percent (wt. %) by total weight of the mixture. In another embodiment, the styrenic monomers are present in amounts from 50 to 99 wt. %. In a further embodiment, the styrenic monomers are present in amounts from 90 to 99 wt. %.

The elastomer may be present in amounts effective to produce one or more user-desired properties. Such effective amounts may be determined by one having ordinary skill in the art with the aid of this disclosure. In an embodiment, the level of elastomer utilized is in an amount ranging from 0.1 to 50 wt. % by weight of solution. In another embodiment, the level of elastomer utilized is in an amount ranging from 0.5 to 40 wt. %. In a further embodiment, the level of elastomer utilized is in an amount ranging from 1 to 30 wt. %. In an even further embodiment, the level of elastomer utilized is in the range of about 5 to 15 wt. %.

In an embodiment, the HIPS made using the methods disclosed herein may have a melt flow rate ranging from 1 to 40 g/10 min., optionally from 1.5 to 20 g/10 min., and optionally from 2 to 15 g/10 min. as determined in accordance with ASTM D-1238. In an embodiment, the HIPS may have a falling dart impact ranging from 5 to 200 in-lb, optionally from 50 to 180 in-lb, and optionally from 100 to 150 in-lb as determined in accordance with ASTM D-3029. In an embodiment, the HIPS may have an Izod impact ranging from 0.4 to 5 ft-lbs/in, optionally from 1 to 4 ft-lbs/in, and optionally from 2 to 3.5 ft-lbs/in as determined in accordance with ASTM D-256. In an embodiment, the HIPS may have a tensile strength ranging from 2,000 to 10,000 psi, optionally from 2,800 to 8,000 psi, and optionally from 3,000 to 5,000 psi as determined in accordance with ASTM D-638. In an embodiment, the HIPS may have a tensile modulus ranging from 100,000 to 500,000 psi, optionally from 200,000 to 450,000 psi, and v from 250,000 to 380,000 psi as determined in accordance with ASTM D-638. In an embodiment, the HIPS may have an elongation at failure ranging from 0.5 to 90%, optionally from 5 to 70%, and optionally from 35 to 60% as determined in accordance with ASTM D-638. In an embodiment, the HIPS may have a flexural strength ranging from 3,000 to 15,000 psi, optionally from 4,000 to 10,000 psi, and optionally from 6,000 to 9,000 psi as determined in accordance with ASTM D-790. In an embodiment, the HIPS may have a flexural modulus ranging from 200,000 to 500,000 psi, optionally from 230,000 to 400,000 psi, and optionally from 250,000 to 350,000 psi as determined in accordance with ASTM D-790. In an embodiment, the HIPS may have an annealed heat distortion ranging from 180 to 215° F., optionally from 185 to 210° F., and optionally from 190 to 205° F. as determined in accordance with ASTM D-648. In an embodiment, the HIPS may have a Vicat softening ranging from 195 to 225° F., optionally from 195 to 220° F., and optionally from 200 to 215° F. as determined in accordance with ASTM D-1525. In an embodiment, the HIPS may have a gloss 60° ranging from 30 to 100, optionally from 40 to 98, and optionally from 50 to 95 as determined in accordance with ASTM D-523.

The polymerization process can be either batch or continuous. In an embodiment, the polymerization reaction may be carried out using a continuous production process in a polymerization apparatus including a single reactor or a plurality of reactors. Reactors and conditions for the production of a polymeric composition are disclosed in U.S. Pat. No. 4,777,210, which is incorporated by reference herein in its entirety.

In an embodiment, the HIPS production process of the present invention includes a pre-inversion reactor followed by an inversion reactor followed by at least one post inversion reactor. In an embodiment, the pre-inversion reactor is a continuous stirred tank reactor (CSTR). In another embodiment, the inversion reactor is a CSTR. As disclosed herein, the term "continuous stirred tank reactor", or "CSTR" is known in the art and refers to a tank having a stirring means, wherein one or more reagents are continuously introduced into the tank whilst at least one product stream is continually removed from the tank. In an alternative embodiment the inversion reactor is a plug flow reactor. In a further embodiment, the at least one post inversion reactor is a plug flow reactor. As disclosed herein, the term "plug flow reactor", or "PFR" is known in the art and refers to a continuous flow reactor having a narrow residence time distribution without significant backmixing of the reagents entering the reactor and the products leaving the reactor. In another alternative embodiment, the output of the at least one post inversion is sent to a devolatilizer. In yet another alternative embodiment, the output of the at least one post inversion reactor is sent to a heater prior to the devolatilizer step.

FIG. 1 illustrates one illustrative embodiment of a HIPS production process of the present invention. This process includes combining a first stream 10 containing a styrenic monomer component and an elastomeric component with a second stream 12 containing a free radical initiator to obtain a combined stream 14. The combined stream 14 is then sent to a pre-inversion reactor V-1, which can be a continually stirred tank reactor (CSTR), wherein the combined stream is polymerized to a point below the phase inversion of the combined stream. As used herein, the term "phase inversion" refers to a discrete point at which polystyrene forms a continuous phase in a solution and styrene and rubber transition from a continuous phase to a discontinuous phase. The pre-inversion stream 16 leaving V-1 is then sent to a CSTR inversion reactor V-2, wherein the contents are polymerized to a point above phase inversion. The post-inversion stream 18 leaving V-2 is then sent to a series of plug flow post inversion reactors R-1, R-2, R-3 and R-4, wherein the contents are further polymerized wherein a HIPS product is obtained at the output of R-4 as stream 20. The HIPS product 20 leaving the output of R-4 is sent to a devolatilizer DV-1 to remove volatile components and to obtain a final HIPS product in line 22. An optional heater H-1 can be located prior to the devolatilizer DV-1. Volatile components removed from the devolatilizer DV-1 are sent via line 24 and can be recycled back to inversion reactor V-2 via line 26. Volatile components can also be removed from pre-inversion reactor V-1 via line 28 and from inversion reactor V-2 via line 30. Liquid flow from R-1 via line 32 is adjusted to maintain appropriate pressure in tubular reactor R1. An accumulator/condensor vessel 34 is shown that can collect the volatile components from lines 24, 28, and 30. The volatile components can be condensed to a liquid in accumulator/condensor vessel 34 and the condensed liquids sent to inversion reactor V-2 via line 26.

In an embodiment, the pre-inversion reactor polymerizes the styrene and rubber mixture to a point below the phase inversion of the mixture. In an embodiment, the inversion reactor polymerizes the styrene and rubber mixture to a point above phase inversion. In an embodiment, the post inversion reactor further polymerizes the styrene and rubber mixture after polymerization in the inversion reactor.

The temperature ranges useful with the process of the present disclosure can be selected to be consistent with the operational characteristics of the equipment used to perform the polymerization. In one embodiment, the temperature range for the polymerization can be from 90° C. to 240° C. In another embodiment, the temperature range for the polymerization can be from 100° C. to 180° C. In a further embodiment, the temperature range for the polymerization can be from 135° C. to 175° C. In yet another embodiment, the polymerization reaction may be carried out in a plurality of reactors with each reactor having an optimum temperature range. For example, the polymerization reaction may be carried out in a reactor system employing a first and second polymerization reactors that are either continuously stirred tank reactors (CSTR) or plug-flow reactors. In an embodiment, a polymerization process for the production of HIPS of the type disclosed herein including a plurality of reactors may have the first reactor (e.g. a CSTR), also known as the pre-inversion reactor, or prepolymerization reactor, operated in the temperature range of from 90° C. to 135° C. while the second reactor (e.g. CSTR or plug flow) may be operated in the range of from 100° C. to 165° C.

The polymerized product effluent from the first reactor, or pre-inversion reactor, may be referred to herein as the prepolymer. When the prepolymer reaches the desired conversion, it may be passed into a second reactor for further polymerization. The polymerized product effluent from the second reactor may be further processed as desired according to the processes disclosed herein or according to any other known method. Upon completion of the polymerization reaction, a styrenic polymer is recovered and subsequently processed, for example devolatilized, pelletized, etc.

In an embodiment, the methods of improving the swell index of HIPS may include improving the swell index by the addition of additives. In another embodiment, the methods of improving the swell index may include improving the swell index by adjusting the temperature of a devolatilizer. In yet another embodiment, the methods include improving the swell index by choosing different types of heat exchangers for use as a devolatilizer. In a further embodiment, the methods of improving the swell index of HIPS may include improving the swell index by the addition of additives as well as the location of adding the additives, adjusting the temperature of a devolatilizer, and the choosing of different types of heat exchangers and any combination thereof.

Crosslinking refers to the linking of rubber particles by the forming or crosslinks, or bridges, between individual polymer chains within a HIPS product. The degree of crosslinking and its structure is determined by the process of making HIPS and can vary considerably. It has been observed that lower temperatures in a devolatilizer hinder the development of crosslinks in a HIPS product. Since swell index is inversely dependent on crosslinking and thus temperature, the swell index of HIPS increases as temperatures decrease in a devolatilizer.

In an embodiment, the HIPS product is devolatized by a process including passing the HIPS through a devolatilizer (DV). In a more specific embodiment, the HIPS product is heated in a devolatilizer pre-heater (DVPH) and the heated HIPS product is sent to a devolatilizer where volatile components are separated from the HIPS product and are recycled to a previous reactor, for instance line 24 of FIG. 1. In an embodiment, the devolatilizer pre-heater is a conventional devolatilizer pre-heater, such as a shell-and-tube heat exchanger. In another embodiment, the devolatilizer pre-heater is a plate heat exchanger. An embodiment of a plate heat exchanger devolatilizer pre-heater suitable for use in the present invention is disclosed in U.S. Pat. No. 7,332,058, which is incorporated by reference herein in its entirety.

In an embodiment, the DV also includes a heating element, such as a heating jacket, to provide further heat to the HIPS product to aid in removing volatile components. In an embodiment, the temperature of the HIPS product in the DV ranges from 400 to 500° F. In another embodiment, the temperature of the HIPS product in the DV ranges from 410 to 475° F. In a further embodiment, the temperature of the HIPS product in the DV ranges from 410 to 450° F. In an aspect, the temperature of the HIPS product in the DV is less than 450° F. In an embodiment, the swell index of a HIPS product is increased, and consequently the crosslinking decreased, by decreasing the temperature of the HIPS product in the DV.

Multiple devolatilizers may be utilized in the process of the present invention. In an embodiment, a HIPS product leaving the reactor is sent to up to 5 devolatilizers. In another embodiment, the HIPS product leaving the reactor is sent to 1 to 4 devolatilizers. In a further embodiment, the devolatilization of the HIPS product is similar to that disclosed in U.S. Pat. No. 7,087,139, which is incorporated by reference herein in its entirety.

It has been observed that the addition of chain transfer agents can reduce the amount of crosslinking in a HIPS product. For instance, the presence of chain transfer agents with a HIPS product in a devolatilizer may hinder the development of crosslinks in a HIPS product during devolatilization. Since swell index is inversely dependent on crosslinking, the addition of chain transfer agents may result in a HIPS product having an increased swell index.

In an embodiment, additives designed to increase the swell index of the HIPS product are added to the process of the present invention. These additives may include chain transfer agents (CTA). In an embodiment, the CTAs are selected from the group of mercaptans, thiols, and halocarbons and combinations thereof. In another embodiment, the CTAs are selected from the group of 1,1-diphenylethylene, 9,10-dihydrophenanthrene, 9,10-dihydroanthracene, 1-phenyl-3,4-dihydronaphthalene, α-methylstyrene dimer, 2-naphthalenethiol, normal dodecylmercaptan (NDM), diethylbromomalonate, α-bromostyrene, β-bromostyrene and combinations thereof. These CTAs vary in strength from weak to strong. Stronger CTAs generally demonstrate a higher chain transfer constant while weaker CTAs generally demonstrate a lower chain transfer constant. Weaker CTAs may include 1,1-diphenylethylene, 9,10-dihydroanthracene, diethylbromomalonate, 2-naphthalenethiol, and b-bromostyrene. Stronger CTAs may include NDM and α-bromostyrene.

Table 1 lists CTAs and their chain transfer constants at certain temperatures. These values are obtained from Polymer Handbook (1975, $2^{nd}$ Edition):

TABLE 1

| Chain Transfer Agent | Chain Transfer Constant ($C_s \times 10^4$) |
|---|---|
| 1,1-diphenylethylene | 450 @ 70° C. |
| 9,10-dihydroanthracene | 750 @ 50° C. |
| α-methylstyrene dimer | 2,700 @ 100° C. |
| 2-Naphthalenethiol | 1,800 @ 99° C. |
| NDM | 130,000 @ 100° C. |
| diethylbromomalonate | 1,200 @ 100° C. |
| α-bromostyrene | 10,000 @ 70° C. |
| β-bromostyrene | 2,000 @ 70° C. |

The CTAs may be used as additives in the process of the present invention in any amount that results in a HIPS product having favorable swell index values. In an embodiment, CTAs are added to the process in any amounts ranging from 10 ppm to 10,000 ppm. In another embodiment, the CTAs are added to the process in amounts ranging from 100 to 1,000 ppm. In a further embodiment, the CTAs are added to the process in amounts ranging from 100 to 400 ppm.

In an embodiment the swell index of the HIPS produced from the method of the present invention has an increase of at least 10% over the swell index of a HIPS produced from a comparable method but without the addition of CTA. In alternate embodiments the swell index is increased by at least 25%, optionally by at least 50%, optionally by at least 100%, optionally by at least 200%, optionally by from 25% to 300%.

The CTAs may be added at any location along the process of the present invention. In an embodiment, the CTAs are added at any point after, or downstream of, the pre-inversion reactor. In another embodiment, the CTAs are added at any point after the first linear flow, or plug flow, reactor. In an alternative embodiment, the CTAs are added at any point after the first post-inversion reactor. In a further embodiment, the CTAs are added at any point between the first plug flow reactor and the last plug flow reactor. In an even further embodiment, the CTAs are only added to the HIPS product entering the devolatilizer.

In an embodiment, a process for the production of the styrenic polymer includes contacting the styrenic monomer, and optionally one or more comonomers, with at least one initiator. Any initiator capable of free radical formation that facilitates the polymerization of styrene may be employed. Such initiators include by way of example and without limitation organic peroxides. Examples of organic peroxides useful for polymerization initiation include without limitation diacyl peroxides, peroxydicarbonates, monoperoxycarbonates, peroxyketals, peroxyesters, dialkyl peroxides, hydroperoxides or combinations thereof. In an embodiment, the initiator level in the reaction mixture is given in terms of the active oxygen in parts per million (ppm). For example, the level of active oxygen level in the disclosed reactions for the production of the styrenic polymer is from 5 ppm to 80 ppm, alternatively from 10 ppm to 60 ppm, alternatively from 20 ppm to 50 ppm. As will be understood by one of ordinary skill in the art, the selection of initiator and effective amount will depend on numerous factors (e.g., temperature, reaction time) and can be chosen by one of ordinary skill in the art with the benefits of this disclosure to meet the desired needs of the process. Polymerization initiators and their effective amounts have been described in U.S. Pat. Nos. 6,822,046; 4,861,127; 5,559,162; 4,433,099 and 7,179,873 each of which are incorporated by reference herein in their entirety.

In an embodiment, the HIPS of the present invention may also include additives as deemed necessary to impart desired physical properties, such as, increased gloss or color. Examples of additives include without limitation stabilizers, chain transfer agents, talc, antioxidants, UV stabilizers, lubricants, plasticizers, ultra-violet screening agents, oxidants, anti-oxidants, anti-static agents, ultraviolet light absorbents, fire retardants, processing oils, mold release agents, coloring agents, pigments/dyes, fillers, and the like. The aforementioned additives may be used either singularly or in combination to form various formulations of the composition. For example, stabilizers or stabilization agents may be employed to help protect the polymeric composition from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure. For example, one or more additives may be added after recovery of the HIPS, for example during compounding such as pelletization. In an embodiment, additives, other than CTA or ESCR additives, may be present in the HIPS in an amount of from 0.1 wt. % to 50 wt. %, alternatively from 0.2 wt. % to 30 wt. %, alternatively from 0.5 wt. % to 20 wt. % based on the total weight of the HIPS.

In an embodiment, ESCR (Environmental Stress Crack Resistance) enhancing additives may be added to the HIPS composition. The ESCR-enhancing additives may be added to the initial monomer/rubber feed stream or at any point in the polymerization process up to and including the final polymerization reactor. In an embodiment, the ESCR-enhancing additives include PIB, mineral oil, or combinations thereof. In another embodiment, the PIB, mineral oil, or combinations thereof are present in amounts of from 0.1 to 10.0%, optionally from 0.5 to 5.0% by weight of the final product. In a further embodiment, both PIB and mineral oil are each present in amounts of from 1.0 to 3.0% by weight of the final product.

An end use article may include a blend of the present invention. In an embodiment, the articles include films, sheets and thermoformed or foamed articles. For example, a final article may be thermoformed from a sheet containing the blend. End use articles may be obtained from the polymeric compositions of this disclosure. In an embodiment, an article can be obtained by subjecting the polymeric composition to a plastics shaping process such as blow molding, extrusion, injection blow molding, injection stretch blow molding, thermoforming, and the like. The polymeric composition may be formed into end use articles including food packaging, office supplies, plastic lumber, replacement lumber, patio decking, structural supports, laminate flooring compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 2:
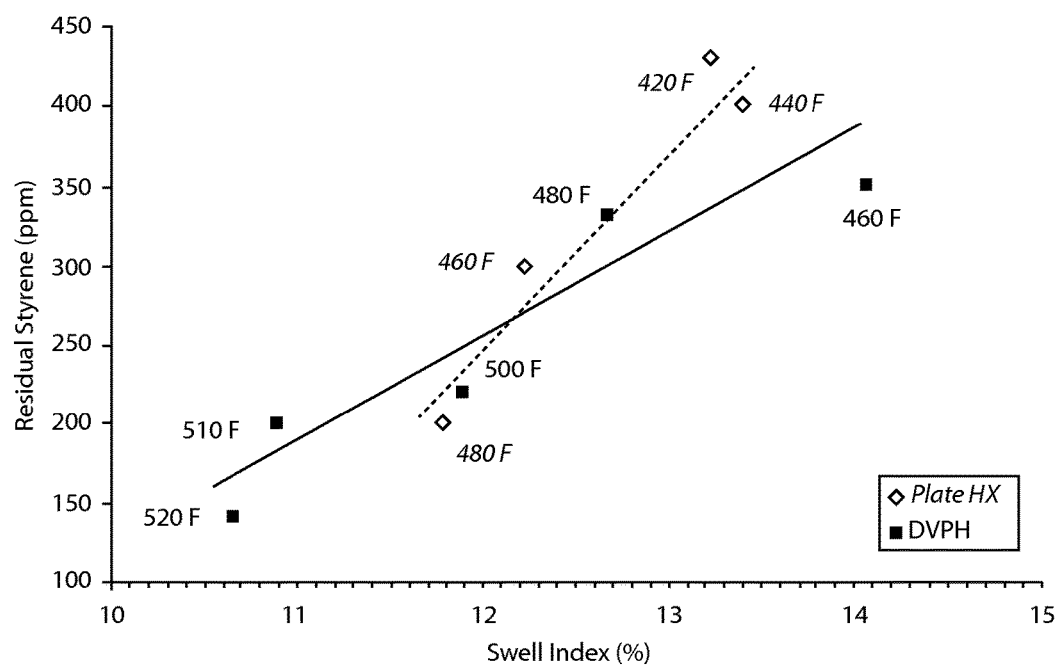
FIG. 2 is a graph of residual styrene versus swell index.

High impact polystyrene (HIPS) was produced using a process having plug flow post-inversion reactors. A HIPS formulation, L-4440 available from Total Petrochemicals, having 8.1% rubber content, was used in this experiment. The HIPS product leaving the final plug flow reactor was sent to a devolatilizer to remove volatile components that were recycled to the feed. Two types of devolatilizers were used, one was a plate heat exchanger (Plate HX) and the other was a devolatilizer having a preheater (DVPH). Table 2 and FIG. 2 shows the residual styrene level versus the swell index at the operating temperatures of the devolatilizers. The results indicate that the swell index of the HIPS product is sensitive to the operating temperature of the devolatilizer and the devolatilizer preheater with lower temperatures providing for higher swell index values. The ability to produce a HIPS product having a swell index of around 12 while achieving a residual styrene of less than 250 ppm is significant and unexpected. The ability to use additives to maintain swell index while reducing residual styrene is significant as there is consumer pressure to reduce residual styrene levels, especially for food contact applications. In an embodiment a HIPS product is made having a swell index of greater than 11.5 with a residual styrene of less than 300 ppm.

Figure 3:
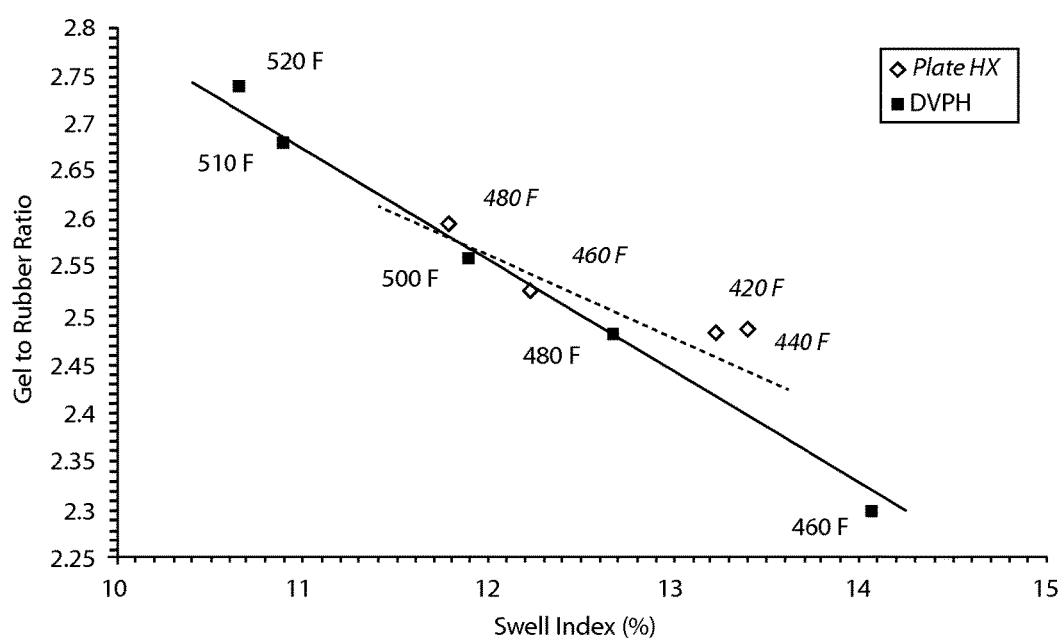
FIG. 3 is a graph of gel to rubber ratio versus swell index.

FIG. 3 depicts the gel to rubber ratios versus swell index. This figure also shows that the swell indexes are temperature sensitive, with lower temperatures providing for higher swell index values.

TABLE 2

| | Temp (° F.) | Swell Index | Residual Styrene (ppm) | Gel Rubber Ratio |
|---|---|---|---|---|
| Plate HX | 420 | 13.2 | 440 | 2.49 |
| | 440 | 13.4 | 400 | 2.49 |
| | 460 | 12.2 | 300 | 2.53 |
| | 480 | 11.8 | 200 | 2.60 |
| DVPH | 460 | 14.1 | 355 | 2.30 |
| | 480 | 12.7 | 340 | 2.48 |
| | 500 | 11.9 | 220 | 2.57 |
| | 510 | 10.9 | 205 | 2.68 |
| | 520 | 10.7 | 145 | 2.74 |

Example 2

High impact polystyrene (HIPS) was produced using a process having polymerization reactors wherein the polymerized HIPS product is sent to devolatilization zone. The feed for the process was 5% Firestone Diene 55 (D55) in styrene. An initiator combination of 200 ppm Lupersol 531 (L-531) and Lupersol 233 (L-233) was used throughout the runs. The final conversions were maintained to be around 75 to 80%.

Eight samples were divided into two groups, with one group using 250 ppm NDM (n-dodecyl mercaptan) and another group using no NDM. Four different devolatilizer temperatures were used: 215, 225, 240, and 255° C., respectively. A devolatilization time of 30 minutes was used throughout the experiments. The swell index results are listed in Table 3 and a graph of swell index versus temperature is shown in FIG. 4.

TABLE 3

| Devolatilizer Temperature | | Swell Index | |
|---|---|---|---|
| Temp (° C.) | Temp (° F.) | No NDM | 250 ppm NDM |
| 215 | 419 | 14.4 | 31.5 |
| 225 | 437 | 12.5 | 16.7 |
| 240 | 464 | 9.1 | 10.0 |
| 255 | 491 | 8.4 | 8.3 |

Figure 4:
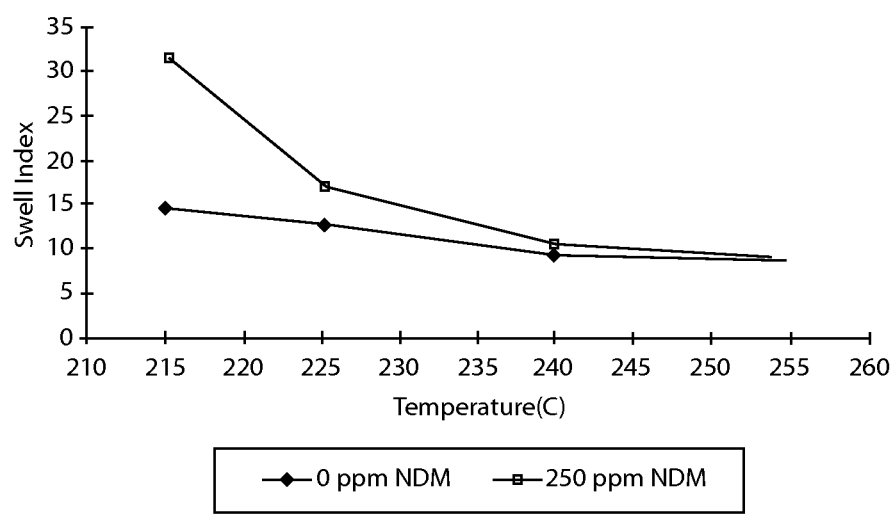
FIG. 4 is a graph of swell index versus temperature.

As shown in FIG. 4, the swell index is dependent upon the temperature, i.e. swell index increases as the temperatures were decreased and that the addition of a CTA (in this case NDM) has an impact upon the relationship of swell index and temperature. The graph shows two curves of swell index versus temperature, wherein one curve represents the addition of 225 ppm NDM and the other curve represents no NDM. As the temperature increased, the two curves converged and thus as the temperature rose, the effect of the NDM diminished. The graph also indicates that if the devolatilizer temperature is too high, even with the presence of a substantial amount of IN or any other chain transfer agents, the swell index cannot be effectively increased. Therefore, the benefits of chain transfer agents are diminished at high temperatures.

Example 3

A HIPS material, 945E, available from Total Petrochemicals USA, Inc., was obtained from a polymerization reactor in a HIPS production process. The obtained sample of 945E had a percent solids of 54% and the polystyrene conversion was 48%. The obtained 945E material was transferred to a reactor and heated to 212° F. The heated material was then diluted with styrene containing 170 ppm of Lupersol 233 and a CTA. The mixture was stirred at 212° F. at a low agitation rate of 60 rpm and the temperature was then increased to 266° F. and the stirring rate was increase gradually to 240 rpm. Then, after 15 minutes from the time the temperature was increased to 266° F., the temperature was increased to 302° F. and held at that temperature for 75 minutes. The reacted material was then devolatized by a preheating step at 239° F. for 15 minutes followed by devolatilization at 419° F.

In addition, batch polymerizations were done with 5% D55/styrene feed initiated with 170 ppm L-233 and containing specified levels of selected CTAs in the feed. The batch polymerizations were compared to the continuous process above to study the effects of CTA on the particle sizes and ultimate molecular weights. An ideal additive for improving swell index would not affect rubber particle size, and only improves the swell index even when added to the feed.

In a first set of runs, the CTAs are added late in the HIPS production process. The results of these runs are shown in Tables 4 and 5. The results shown in Table 4 include data on additive amount, swell index, gel, and rps, while the results shown in Table 5 include data on pellet molecular weight.

TABLE 4

| Run | Additive | Additive Amount (ppm) | Swell Index | Gel (%) | RPS (micron) (span) |
|---|---|---|---|---|---|
| 1 | None | None | 10.2 | 15.8 | 2.72(1.62) |
| 2 | 1,1-diphenylethylene | 1500 | 11.7 | 15.1 | 2.58(1.57) |
| 3 | 9,10-dihydrophenanthrene | 1000 | 12.7 | 16.4 | 2.71(1.61) |
| 4 | 9,10-dihydroanthracene | 1000 | 14.6 | 13.6 | 3.06(1.86) |
| 5 | 1-phenyl-3,4-dihydronaphthalene | 1000 | 11.3 | 15.9 | 2.49(1.47) |
| 6 | α-methylstyrene dimer | 800 | 11.4 | 16 | — |
| 7 | 2-naphthalenethiol | 1000 | >30 | 0 | — |
| 8 | Diethylbromomalonate | 1000 | 14.5 | 13.7 | — |
| 9 | NDM | 400 | 28.4 | 4.6 | 2.62(1.56) |
| 10 | β-bromostyrene | 400 | 13.8 | 15.7 | 3.05(1.76) |
| 11 | NDM | 400 | 28.4 | 4.6 | 2.62(1.56) |
| 12 | 2-naphthalenethiol | 400 | 16.6 | 9.3 | 3.16(1.76) |
| 13 | β-bromostyrene | 400 | 10.6 | 19.3 | 2.82(1.62) |
| 14 | Diethylbromomalonate | 400 | 21.0 | 10.4 | 2.87(1.68) |
| 15 | 9,10-dihydroanthracene | 400 | 14.5 | 14.4 | 2.93(1.69) |
| 16 | NDM | 100 | 12.5 | 15.4 | 2.73(1.60) |
| 17 | α-bromostyrene | 100 | 11.6 | 16.6 | 2.73(1.63) |
| 18 | β-bromostyrene | 100 | 11.5 | 16.3 | 2.89(1.70) |
| 19 | 2-naphthalenethiol | 100 | 23.4 | 6.1 | 3.05(1.81) |
| 20 | Diethylbromomalonate | 100 | 11.6 | 16.4 | 2.75(1.62) |
| 21 | 9,10-dihydroanthracene | 100 | 12.4 | 16.2 | 2.74(1.65) |

TABLE 5

| Run | Additive | Mn (pellets) | Mw (pellets) | Mz (pellets) | MWD (pellets) |
|---|---|---|---|---|---|
| 1 | None | 116358 | 287317 | 494481 | 2.47 |
| 2 | 1,1-diphenylethylene | 122413 | 285397 | 493217 | 2.33 |
| 3 | 9,10-dihydrophenanthrene | 110053 | 266983 | 465009 | 2.43 |
| 4 | 9,10-dihydroanthracene | 104329 | 264172 | 489699 | 2.53 |
| 5 | 1-phenyl-3,4-dihydronaphthalene | 108397 | 264001 | 464939 | 2.44 |
| 6 | α-methylstyrene dimer | 96957 | 259037 | 477193 | 2.67 |
| 7 | 2-naphthalenethiol | 86501 | 288136 | 554132 | 3.33 |
| 8 | Diethylbromomalonate | 91312 | 238345 | 430050 | 2.61 |
| 9 | NDM | 94187 | 262181 | 508180 | 2.78 |
| 10 | β-bromostyrene | 102725 | 263880 | 470520 | 2.57 |
| 11 | NDM | 94187 | 262181 | 508180 | 2.78 |
| 12 | 2-naphthalenethiol | 88585 | 257660 | 460460 | 2.91 |
| 13 | β-bromostyrene | 102223 | 265245 | 468408 | 2.59 |
| 14 | Diethylbromomalonate | 101366 | 253830 | 446257 | 2.50 |
| 15 | 9,10-dihydroanthracene | 109700 | 264162 | 470349 | 2.41 |
| 16 | NDM | 106418 | 259557 | 459413 | 2.44 |
| 17 | α-bromostyrene | 110537 | 271064 | 471252 | 2.45 |
| 18 | β-bromostyrene | 110174 | 270771 | 469414 | 2.46 |
| 19 | 2-naphthalenethiol | 101886 | 268151 | 483666 | 2.63 |
| 20 | Diethylbromomalonate | 111178 | 267845 | 467120 | 2.41 |
| 21 | 9,10-dihydroanthracene | 112642 | 266430 | 470534 | 2.37 |

As can be seen from Table 4, the location, amount and type of CTA additive can increase swell index to up to 300%. One purpose of adding the CTA later in the process is to make sure that all other variables, such as inversion conditions and grafting, etc., remain the same. The other reason for adding the CTA later in the process is to maintain a constant rubber particle size. This is because CTAs such as NDM, when added prior to inversion, can increase the rubber particle size drastically. Consequently, in these examples in which the CTAs are added late in the process, the rubber particle size in all reactions were essentially constant. With the exception of Run 7, the rubber particle size (RPS) has remained constant when the CTA was added late in the process. The only differences in the product due to the addition of CTAs late in the process were in the ultimate molecular weights and swell index along with the associated gel values.

To test the effect of CTAs added early in the process, batch experiments were performed. In each run, each CTA was added to the feed (5% D55 in styrene) containing the initiator L233 and the polymerizations were run under batch conditions. The results are shown in Tables 6 and 7.

TABLE 6

| Run | Additive | Additive Amount (ppm) | Swell Index | Gel (%) | RPS (micron) (span) |
|---|---|---|---|---|---|
| 1 | None | None | 12.7 | 19.8 | 2.75(1.03) |
| 2 | NDM | 400 | 16.9 | 13 | 11.35(1.48) |
| 3 | 9,10-dihydroanthracene | 400 | 13.9 | 18.4 | 2.92(1.22) |
| 4 | Diethylbromomalonate | 400 | 11.1 | 19.9 | 2.81(1.14) |
| 5 | 2-naphthalenethiol | 400 | 29.2 | 5.35 | 3.68(0.98) |
| 6 | 2-naphthalenethiol | 100 | 15.8 | 16.5 | 3.05(0.97) |
| 7 | α-bromostyrene | 400 | 15.7 | 21 | 5.02(3.15) |
| 8 | 9,10-dihydrophenanthrene | 400 | 13.7 | 17.6 | 2.44(1.61) |
| 9 | 1-phenyl-3,4-dihydronaphthalene | 400 | 10.9 | 20.5 | 2.47(0.94) |

TABLE 7

| Run | Additive | Mn (pellets) | Mw (pellets) | Mz (pellets) | MWD (pellets) |
|---|---|---|---|---|---|
| 1 | None | 99452 | 234172 | 384162 | 2.35 |
| 2 | NDM | 86360 | 201856 | 332566 | 2.34 |
| 3 | 9,10-dihydroanthracene | 99708 | 222791 | 362202 | 2.23 |
| 4 | Diethylbromomalonate | 85838 | 209491 | 341242 | 2.44 |
| 5 | 2-naphthalenethiol | 77553 | 225969 | 373243 | 2.91 |
| 6 | 2-naphthalenethiol | 84236 | 224867 | 378551 | 2.67 |
| 7 | α-bromostyrene | 87851 | 220264 | 371551 | 2.51 |
| 8 | 9,10-dihydrophenanthrene | 94535 | 210753 | 338741 | 2.23 |
| 9 | 1-phenyl-3,4-dihydronaphthalene | 87150 | 216525 | 370099 | 2.48 |

The CTAs that had the most influence on the rubber particle sizes were NDM and α-bromostyrene. These CTAs have the highest chain transfer constants for styrene polymerization. The results show that rubber particle sizes are similar to the control reaction for all CTA, except for NDM and α-bromostyrene. Thus, as shown earlier, weak CTAs reduce polystyrene molecular weights later in the process, whereas strong CTAs such as NDM, reduce the molecular weights very early in the process. Runs 5 and 6 with 2-naphthalenethiol produced the lowest Mn, lower than NDM even at the reduced additive amount of Run 6.

The swell indices were the highest for naphthalenethiol at 400 ppm in both the continuous and batch runs. Even at 100 ppm, a swell index value of 16 was observed. A swell index value of 17 was observed for NDM. This value was lower than that observed when NDM was added later in the process.

The molecular weight data shows that 2-naphthalenethiol gave broader molecular weight distribution due to low number average molar mass (Mn) but high weight average molar mass (Mw) and average molar mass (Mz), whereas the NDM gives a polystyrene having a narrower Mn and a lower Mw and Mz. The dihydro derivatives, namely 9,10-dihydroanthracene, 9,10-dihydrophenanthrene, and 1-phenyl-3,4-dihydronaphthalene produced a polystyrene with the narrowest MWD distribution values in a manner similar to NDM. The bromo compounds showed low Mn and intermediate MWD. Keeping in mind that α-bromostyrene gave a very large particle size (5.0 microns), it appears that this compound lowers the molecular weights early in the process at the time of inversion. This assumption is supported by its high chain transfer constant.

The results show that naphthalenethiol is a much stronger chain transfer agent than the literature values suggest. One of the reasons may be that the chain transfer increases much more rapidly with temperature than the other weak CTAs, tested. A slight increase in the rubber particle size when added to the feed, coupled with the very high swell index even at low levels such as 100 to 400 ppm, suggests that naphthalenethiol may be more than a simple chain transfer agent. If it is simply acting as a weak CTA, only activated in the devolatilization units, then the following scenario may explain the observations. It is possible that some of the naphthalenethiol is being oxidized initially to a disulfide by peroxide. It is the small amounts of the disulfide, which act as a strong CTA at the time of inversion and provides slightly larger rubber particle sizes. But, the major portion of napthalenethiol survives until it reaches devolatilization conditions and inhibits the rubber cross-linking processes.

2-Naphthalenethiol, and other weaker chain transfer agents, such as the dihydroaromatics, namely 9,10-dihydroanthracene, 9,10-dihydrophenanthrene, a pure styrene dimer, and bromo compounds, such as α-bromosyrene and diethyl bromomalonate, were effective in increasing swell index when added either early or late in the process. Their effects on the rubber particle sizes were minimal. Their effectiveness in increasing the swell index depends on their type and level. 2-naphthalenethiol at 1000 ppm prevents rubber cross-linking completely (swell index >30), whereas at 100 to 400 ppm levels, swell index values in the range 15-29 were obtained. With diethyl bromomalonate swell index values in the range 11-21 were obtained when the level changed from 100 to 1000 ppm. The dihydroaromatics gave swell index values in 11-15 when used in the range of 100 to 1000 ppm.

The results suggest that weaker chain transfer agents which are activated at elevated temperatures, for example in the devolatilization units, would prevent rubber cross-linking processes, thus yielding high swell index products. The results also show that very strong chain transfer agents, particularly NDM, also give very high swell indices, irrespective of which stage it is added. If a strong chain transfer agent is added in the beginning of the process such as in the feed, it will increase the rubber particle sizes substantially because of the decreased molecular weights at the time of inversion, whereas if it is added later in the process, the rubber particle sizes are not affected and only high swell indices are obtained.

The various embodiments of the present invention can be joined in combination with other embodiments of the invention and the listed embodiments herein are not meant to limit the invention. All combinations of embodiments of the invention are enabled, even if not given in a particular example herein.

The rubber particle size (RPS) is determined using ASTM F577-78 Malvern Particle Size Analyzer. The RPS is in microns and span is a measure of broadness of the distribution and is defined as:

Malvern Results in Methyl Ethyl Ketone Solvent:

The volume median diameter $D(v,0.5)$ is the diameter where 50% of the distribution is above and 50% is below.

Two determinations of mean particle size should not differ by more than 5% relative. The shape of the curves in the two determinations should be the same.

The volume diameter $D(v,0.9)$ is where 90% of the volume distribution is below this value.

The volume diameter $D(v,0.1)$ is where 10% of the volume distribution is below this value.

The span is the width of the distribution based on the 10%, 50% and 90% quantile.

$$\text{Span}=[D(v,0.9)-D(v,0.1)]/[D(v,0.5)]$$

Swell index and gel content are determined using the procedure outlined in the "Encyclopedia of Industrial Chemical Analysis", F. D. Snell and L. S. Ettre, Eds., Vol. 18, p. 329 (1973), Interscience Publishers, New York. The gel content, which expresses the degree of grafting, i.e. the quantity of polystyrene grafted on to the rubber, is determined by shaking 1 g of the HIPS in 20 ml of toluene at room temperature, and then centrifuging the whole to separate toluene-insoluble gel from the remainder.

The percentage of gel, related to the sample taken, expresses the gel content; and the swell index, which enables the degree of crosslinking to be expressed, is equal to the ratio of the mass of the toluene swollen gel to the mass of the dry resin.

As used herein, the term "pre-inversion" refers to the initial stages of polymerization of a styrene monomer-rubber mixture, wherein styrene and rubber are in a continuous phase in a solution while polystyrene is in a discontinuous phase.

As used herein, the term "phase inversion" refers to a discrete point at which polystyrene forms a continuous phase in a solution and styrene and rubber transition from a continuous phase to a discontinuous phase.

As used herein, the term "inversion reactor" refers to a polymerization reactor in which phase inversion occurs.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed:

1. A method comprising:
feeding at least one vinyl aromatic monomer and at least one elastomer to at least one polymerization reactor to form a first reaction mixture;
polymerizing the first reaction mixture in the at least one polymerization reactor to form a second reaction mixture, the second reaction mixture including a HIPS product;
sending the second reaction mixture to a devolatilizer, wherein a chain transfer agent is only added to the HIPS product entering the devolatilizer, and wherein the chain transfer agent is present in the devolatilizer during devolatilization of the HIPS product; and
obtaining the high impact polystyrene product from the devolatilizer.

2. The method of claim 1, wherein a rubber particle size exhibited by the high impact polystyrene product is constant after addition of the chain transfer agent, and wherein the rubber particle size is determined in accordance with ASTM F577-78.

3. The method of claim 1, wherein the chain transfer agent is added in amounts ranging from 10 to 10,000 ppm.

4. The method of claim 1, wherein the high impact polystyrene product has a residual styrene level of less than 300 ppm.

5. The method of claim 1, wherein the high impact polystyrene product has a swell index of at least 11.5.

6. The method of claim 1, wherein the devolatilization zone comprises a devolatizer having a preheater, wherein the preheater is a shell-and-tube heat exchanger or a plate heat exchanger.

7. The method of claim 1, wherein the devolatilization zone is operated at a temperature of less than 480° F.

8. The method of claim 1, further comprising adding an Environmental Stress Crack Resistance (ESCR) enhancing additive to the high impact polystyrene product, wherein the ESCR enhancing additive comprises PIB, mineral oil, or combinations thereof, and wherein the PIB, the mineral oil, or combinations thereof is present in an amount ranging from 0.1 to 10.0% by weight of the high impact polystyrene product.

9. The method of claim 1, wherein the high impact polystyrene product exhibits one or more of: a falling dart impact ranging from 5 to 200 in-lb as determined in accordance with ASTM D-3029; an Izod impact ranging from 0.4 to 5 ft-lbs/in as determined in accordance with ASTM D-256; a tensile strength ranging from 2,000 to 10,000 psi as determined in accordance with ASTM D-638; a tensile modulus ranging from 100,000 to 500,000 psi as determined in accordance with ASTM D-638; an elongation at failure ranging from 0.5 to 90% as determined in accordance with ASTM D-638; a flexural strength ranging from 3,000 to 15,000 psi as determined in accordance with ASTM D-790; a flexural modulus ranging from 200,000 to 500,000 psi as determined in accordance with ASTM D-790; an annealed heat distortion ranging from 180 to 215° F. as determined in accordance with ASTM D-648; a Vicat softening ranging from 195 to 225° F. as determined in accordance with ASTM D-1525; and a gloss 60° ranging from 30 to 100 as determined in accordance with ASTM D-523.

10. A method comprising:
feeding at least one vinyl aromatic monomer and at least one elastomer to at least one polymerization reactor to form a first reaction mixture;
polymerizing the first reaction mixture in the at least one polymerization reactor to form a second reaction mixture, the second reaction mixture comprising a HIPS product;
combining a chain transfer agent with the HIPS product only when the HIPS product is entering a devolatilizer to form a combined mixture, wherein the chain transfer agent is present in the devolatilizer during devolatilization of a high impact polystyrene product; and
obtaining the high impact polystyrene product from the devolatilizer;
wherein:
the chain transfer agent is 1,1-diphenyl ethylene; 9,10-dihydroanthracene; diethylbromomalonate; 2-naphthalenethiol; or β-bromostyrene only activated in the devolatilization zone.

11. The method of claim 10, wherein a rubber particle size exhibited by the high impact polystyrene product is constant after addition of the chain transfer agent, and wherein the rubber particle size is determined in accordance with ASTM F577-78.

12. A method comprising:
feeding at least one vinyl aromatic monomer and at least one elastomer to at least one polymerization reactor to form a first reaction mixture;
polymerizing the first reaction mixture in the at least one polymerization reactor to form a second reaction mixture comprising a HIPS product;
combining a chain transfer agent with the second reaction mixture having a HIPS product to form a combined mixture comprising a HIPS product, wherein the chain transfer agents are only added to the HIPS product entering a devolatilizer after the HIPS product has left the polymerization reactor;
sending the combined mixture to a devolatilizer; and
obtaining the high impact polystyrene product from the devolatilization zone.

* * * * *